United States Patent
Scholz et al.

(10) Patent No.: US 10,584,520 B2
(45) Date of Patent: *Mar. 10, 2020

(54) METHOD FOR CLOSING A MOTOR VEHICLE HOOD

(71) Applicant: Kiekert Aktiengesellschaft, Heiligenhaus (DE)

(72) Inventors: Michael Scholz, Essen (DE); Holger Schiffer, Meerbusch (DE); Omar Inan, Dorsten (DE); Thomas Hulsmann, Rohrbach (DE)

(73) Assignee: Kiekert AG, Heiligenhaus (DE)

( * ) Notice: Subject to any disclaimer, the term of this patent is extended or adjusted under 35 U.S.C. 154(b) by 583 days.

This patent is subject to a terminal disclaimer.

(21) Appl. No.: 15/115,768

(22) PCT Filed: Feb. 2, 2015

(86) PCT No.: PCT/DE2015/000034
§ 371 (c)(1),
(2) Date: Aug. 1, 2016

(87) PCT Pub. No.: WO2015/113546
PCT Pub. Date: Aug. 6, 2015

(65) Prior Publication Data
US 2017/0009495 A1  Jan. 12, 2017

(30) Foreign Application Priority Data
Jan. 31, 2014  (DE) .......... 10 2014 201 808

(51) Int. Cl.
*E05B 83/24*  (2014.01)
*E05B 81/20*  (2014.01)
(Continued)

(52) U.S. Cl.
CPC .............. *E05B 83/24* (2013.01); *B62D 25/12* (2013.01); *E05B 77/08* (2013.01); *E05B 81/14* (2013.01); *E05B 81/16* (2013.01); *E05B 81/21* (2013.01)

(58) Field of Classification Search
CPC .......... E05B 83/24; E05B 77/08; E05B 81/14; E05B 81/21; E05B 83/243; E05B 83/247;
(Continued)

(56) References Cited

U.S. PATENT DOCUMENTS 2,508,090 A * 5/1950 Beems .................... E05B 83/16
  292/108
6,439,623 B1 * 8/2002 Lohfeld .................. E05B 81/20
  292/201
(Continued)

FOREIGN PATENT DOCUMENTS

DE       100 33 092 A1    1/2002
DE   10 2004 011 798 B3   10/2005
(Continued)

OTHER PUBLICATIONS

International Search Report for corresponding Patent Application No. PCT/DE2015/000034 dated Jun. 12, 2015.

*Primary Examiner* — Nathan Cumar
(74) *Attorney, Agent, or Firm* — Renner, Otto, Boiselle & Sklar, LLP

(57) ABSTRACT

The problem addressed by the invention is to devise a method for closing a motor vehicle hood which makes it possible to minimize a gap between the hood and the vehicle body. This should in particular make it possible to keep the risk of injuries low. In order to solve said problem, the hood is closed as follows by means of a hood closing device comprising a locking bolt (35) and a locking mechanism consisting of a rotary latch (1) and a pawl (7): the open hood is moved in the direction of the closed position; this move- (Continued)

Figure 1:
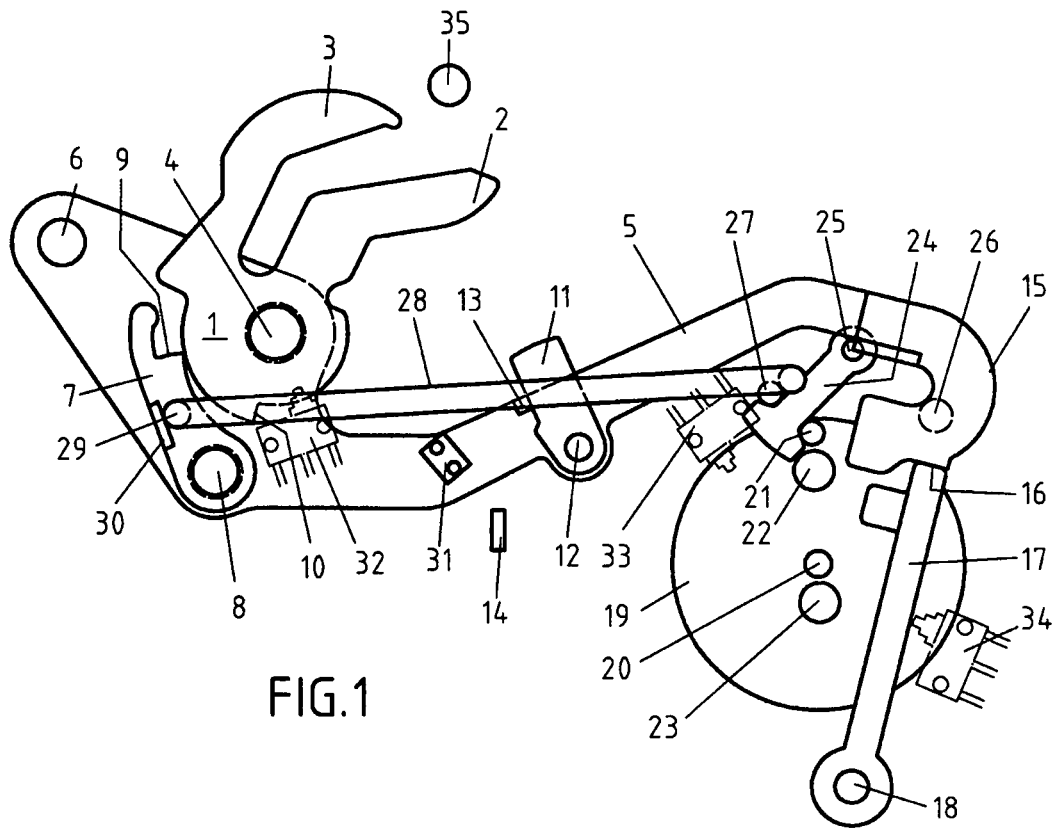

ment of the hood causes the locking bolt (35) to pivot the rotary latch (1) about its pin (4) in the direction of the latched position until the rotary latch (1) hits a breakthrough preventing contraption, in particular a catching lever (11), whereupon the hood or the rotary latch along with the hood is moved using a drive unit (19), in particular an electric drive unit, in such a way that the gap between the hood and the motor vehicle body is reduced; following this movement caused by the drive unit, the rotary latch (1) is locked by the pawl (7).

15 Claims, 3 Drawing Sheets

(51) Int. Cl.
*E05B 77/08* (2014.01)
*E05B 81/14* (2014.01)
*B62D 25/12* (2006.01)
*E05B 81/16* (2014.01)

(58) Field of Classification Search
CPC .......... E05B 81/15; E05B 81/20; E05B 81/16; B62D 25/12; Y10T 292/696; Y10T 292/699; Y10T 292/702; Y10T 292/60

USPC ......................................................... 292/201
See application file for complete search history.

(56) References Cited

U.S. PATENT DOCUMENTS

| | | | | |
|---|---|---|---|---|
| 2001/0028232 A1* | 10/2001 | Koerwer | ................. | E05B 81/14 318/445 |
| 2007/0029814 A1* | 2/2007 | Coleman | ................. | E05B 81/14 292/201 |
| 2010/0237632 A1* | 9/2010 | Browne | .............. | E05B 47/0009 292/201 |
| 2013/0300134 A1* | 11/2013 | Jayasuriya | .............. | E05B 77/08 292/129 |
| 2016/0340939 A1* | 11/2016 | Scholz | .................... | E05B 81/06 |
| 2017/0009494 A1* | 1/2017 | Scholz | .................... | E05B 77/08 |
| 2017/0191291 A1* | 7/2017 | Scholz | .................... | E05B 81/14 |

FOREIGN PATENT DOCUMENTS

| | | |
|---|---|---|
| DE | 10 2004 013 671 A1 | 10/2005 |
| DE | 10 2006 026 282 A1 | 12/2007 |
| DE | 10 2013 109 051 A1 | 2/2015 |
| JP | S52 99211 U | 7/1977 |
| WO | WO 2005/093195 A2 | 10/2005 |
| WO | WO 2015/024555 A1 | 2/2015 |

* cited by examiner

METHOD FOR CLOSING A MOTOR VEHICLE HOOD

The invention relates to a procedure for latching of a hood of a motor vehicle with a latching device with a locking mechanism comprising a catch and at least a pawl for latching of the catch. The latching device comprises a drive, with which the locking mechanism can be moved in such a way that a gap between the hood and the adjacent chassis can be minimized.

The purpose of a latching device of the type initially stated is for the temporary closure of openings in motor vehicles or buildings with the aid of doors or flaps. In the closed state of such a latching device the catch encompasses a bracket-shaped locking bolt in particular with two arms (named load arm and collecting arm). In the case of a motor vehicle, the locking bolt can be attached to a door or a flap of the motor vehicle and then the locking mechanism to the chassis or vice versa. The present invention is especially advantageous for front hoods or front flaps which are located at the front when viewed in the usual direction of travel of a motor vehicle.

If the catch of such a latch or latching device reaches a closed position by Within the scope of the invention, the locking mechanism is regularly installed on the chassis side and is therefore attached to a pertaining motor vehicle chassis. In contrast, the locking bolt is connected to a hood.

If the catch of such a latch or latching device reaches a closed position by means of pivoting starting in an open position, the catch is ultimately latched by means of the pawl. Such a pivoting is attained by the locking bolt (also referred to as "latch holder") if it engages into the catch by closure of a pertaining flap or hood. A locking surface of the pawl is then adjacent to a locking surface of the catch in the latched position, whereby the catch is prevented from being rotated back in the direction of the open position. The locking bolt can no longer leave the locking mechanism in the closed position.

For opening it is necessary to move the pawl out of its ratched position. If the pawl is moved out of its ratched position, the catch rotates in the direction of the open position. The locking bolt can leave the latch or latching device in the open position of the catch and thus in the open position of the locking mechanism. The door or flap can thus be opened again.

There is a locking mechanism with two different ratchet positions of the catch. The catch can then initially be latched in the so-called pre-ratchet position and by further rotation in the closed position ultimately in the so-called main ratchet position.

DE 10 2008 005 181 A1 describes a latching aid to pull a flap or a door of a vehicle towards the motor vehicle chassis. The purpose of the known drive is to also open the door or flap. A combined closure and electrical opening of a tailgate latch arises from the publications DE 100 33 092 A1, DE 10 2004 011 798 B3 and DE 10 2004 013 671 A1.

There is an activation device in order to be able to open the locking mechanism. If the activation device is activated, the locking mechanism opens. A door or flap handle can be part of the activation device. This handle is generally connected to an activation lever of the latch or latching device via a rod or a Bowden cable. If the handle is activated, the activation lever of the latch is pivoted in such a way by means of the rod or the Bowden cable that the latch opens. A motor vehicle can demonstrate an external handle which is generally pivotable and can be reached from the outside and/or a generally pivotable internal handle which can be reached from the inside.

If a locking mechanism of a motor vehicle is latched by closure of a door or a flap, a gap fundamentally remains between the door or flap and the adjacent chassis. Such a gap should be kept as small as possible, especially for hoods located at the front when viewed from the usual direction of travel in order to prevent disadvantageous air turbulence in the front area and associated air resistance during a journey. However, a closed surface which is as gap-free as possible is also desired for optical reasons.

The German pre-registration DE 10 2013 109 051 deals with minimization of such gaps on doors or flaps. The known latch is mobile and in particular pivotably located. Following latching of the locking mechanism, the latch is moved or pivoted overall by a drive in such a way that a gap between the door or flap and chassis is minimized. The drive provided for this purpose comprises an electromotor and a pivotable lever which is known as a swing arm. By pivoting of the lever or the swing arm (hereinafter also known as a "swing lever") by the electromotor the latch overall is pivoted in such a way that the gap is minimized. The latch housing is held by a jack which is pivotably attached to the swing arm.

Insofar as not specified otherwise hereinafter, the object of the invention can demonstrate the aforementioned characteristics individually or in any combination.

It is a task of the invention to specify a procedure with which a gap of a flap can be minimized. A particular objective is to minimize the risk of injuries.

In order to solve the task, a procedure encompasses the characteristics of the first claim. Advantageous designs result from the dependent claims.

The procedure for closure of a hood of a motor vehicle with a latching device comprising a locking bolt and a locking mechanism comprising a catch and a pawl for the hood demonstrates the following steps for solution:

The open hood is moved in the direction of the closed position. This can take place manually, but also by a drive, thus for example by an electrical drive. The locking bolt of the latching device ultimately pivots the catch of the latching device around its axis in the direction of its ratchet position by moving the hood, until the catch and in particular the load arm of the catch strikes a retention lever, i.e. the catch is retained by the retention lever and thus prevents further rotation.

The load arm preferably strikes, i.e. the arm which directly prevents the locking bolt from leaving the locking mechanism in the ratchet position of the locking mechanism. This means on the one hand that the catch can be rotated suitably far. On the other hand, the load arm is fundamentally designed and dimensioned in such a way that it can cope with heavy loads. It can therefore also cope with an impact on the retention lever.

In one design form, the movement of the hood in the direction of the closed position can be detected by a sensor, thus for example by a microswitch, which causes the retention lever to be moved into its retaining position in order to be able to retain, i.e. stop, the rotary movement of the catch. Alternatively, opening of the hood can be detected by a sensor, for example a microswitch which causes the retention lever to be moved into its retaining position. Alternatively, the retention lever can have been moved into its retaining position within the scope of opening of the hood.

Forces are conducted into the retention lever which are caused by closure of the hood. Thus, mechanically sensitive components of the latching device and in particular a drive of the latching device can be protected from such forces and thus from damage. The retention lever can, for example, be directly attached to the chassis. However, it can also be attached to a mechanically loadable component of the latching device which, in turn, is capable of deflecting such forces into the chassis directly or via one or several mechanically loadable components. In particular, the retention lever can be attached to a swing arm on which the catch and/or the pawl is attached.

The retention lever acts as an impact absorber and provides protection from excessive forces if the hood is initially closed at high speed. The impact absorber, i.e. the retention lever, enables the latching device not to be damaged even at hood closure speeds of 3 m/s.

In one design, the hood gap following retention is 10 mm to 30 mm, preferably at least 15 mm. It thus remains until retention of a sufficiently large gap. This prevents fingers being severely squashed in the gap by slamming of the hood. Therefore, the retention both prevents damage to the latching device and reduces the risk of injury.

If the catch is retained by the retention lever and its rotary movement has been stopped, the hood or the catch is moved together with the hood by a drive or using a drive, in particular an electrical drive, in such a way that a hood gap between the hood and the chassis of the motor vehicle is reduced. This happens in particular with limited force which is less than the force which can be provided by the drive. This thus prevents a finger in the hood gap being squashed with great force. Preferably the movement of the hood or the catch together with the hood causes the hood to move solely by gravity in this phase in the direction of the chassis which is first and foremost possible if the catch has not yet been latched and/or the movement of the catch also solely based on gravity. The drive therefore does not provide the force to be applied for movement of the hood or movement of the hood together with the catch. A finger in the hood gap can only be gently squashed in this execution form. The risk of injury is therefore low. The hood gap can thus be reduced from 15 mm to 7 mm for example.

In a technically simple execution form, the catch is moved in the aforementioned manner by means of a swing arm. The catch is then directly or indirectly connected to the swing arm. In particular, the catch is pivotably attached to the swing arm by an axis. Pivoting of the swing arm then causes the catch to move.

Alternatively or additionally, in one configuration the retention lever can initially be moved out of its retaining position by the drive in order to facilitate continuation of the rotating movement of the catch in the direction of its ratchet position and in order to reduce the gap. Continuation of the rotating movement of the catch can be based on gravity and in particular due to the gravity of the hood without a drive rotating the catch. The hood gap can thus be reduced for example from 15 mm to 7 mm and in particular also limited in force.

The preferably force-restricted reduction of the hood gap by movement of the catch by means of the drive causes in particular the hood gap to be a maximum of 10 mm, preferably a maximum of 8 or 7 mm following movement. The hood gap is then sufficiently small to prevent fingers from regularly entering the hood gap. The hood gap can have been 12 mm to 25 mm directly before the preferably force-reduced movement of the hood, thus, for example 15 mm. The hood gap is thus small before the preferably force-reduced movement, but not sufficiently small to prevent fingers regularly entering the hood gap. The preferably force-limited movement reduces the hood gap by several millimeters preferably by at least 2 mm, of particular preference by at least 5 mm. Subsequently, the hood gap is in particular so small that fingers can regularly no longer be pushed into the hood gap.

The catch is ratcheted into its ratchet position by pivoting of the pawl and for the aforementioned reasons in particular only following the preferably force-limited decrease. The pawl can be moved into its ratcheting position by spring force and/or movement of a mechanism provided for, such as a rod. The mechanism can be moved by a drive, in particular an electrical drive. The latching of the catch can be activated by a sensor, thus for example a microswitch, as soon as the sensor has detected that the catch and/or the hood have been moved in a force-limited manner by a drive. Such a movement is in particular a lowering movement to enable movement by gravity.

After the catch and/or the hood have been moved preferably in a force-limited manner by a drive and before the catch is latched, an intermission of, for example, at least 0.5 seconds is inserted, for example 0.5 seconds to 2 seconds. It is thus ensured in an improved manner that the hood gap is regularly reduced in such a way that no fingers can enter it. The drive which has caused the preferably force-limited movement can be stopped for this purpose in one design following the force-limited movement and preferably for at least 0.5 seconds and subsequently reactivated with relevant temporal delay to cause the catch to be latched. In one design, the activation of the drive following the intermission or temporal delay can also cause the hood gap to become smaller initially, thus for example made smaller by another 0.5 to 2 mm, in particular in turn in a force-limited manner in the pre-stated sense. The catch is only latched subsequently. The aim of this design is to ensure better attainment of a hood being systematically closed and the risk of injury being low.

Start and stop signals for the drive can in turn originate from one or several sensors, such as microswitches, which detect the position of suitable components.

In one design the retention lever is subsequently pivoted out of its retaining position following latching of the catch. This is initially associated with the advantage that the catch can be pivoted into an overstroke position, i.e. can be pivoted further away from its open position. The hood thus remains at least advantageously flexible in the area of its latching device. This reduces the risk of injury for persons who fall onto a closed hood.

In one design of the invention, the catch is moved by a drive and preferably by a swing arm in such a way following pivoting out of the retention lever that the hood gap is further reduced and preferably by at least 3 mm, most preferably by at least 5 mm. This happens in particular not in a force-limited manner. "Not force-limited" means that the catch and thus the hood can be further moved with the force provided by the drive. The force responsible for movement of the hood is therefore restricted in particular not only to gravity. Following this further reduction, the hood gap is preferably less than 6 mm, most preferably less than 3 mm, of particular preference less than 1 mm. In a further improved execution form the hood gap is finally only 0 to 0.3 mm.

In an alternative design, the catch is only latched into a pre-ratchet position and is then further rotated to the main ratchet position by means of a closure aid and then latched into the main ratchet position by the pawl or a further pawl. A closure aid means a drive and a mechanism which is capable of rotating the catch in the pre-stated manner. Following latching in the main ratchet position the closure aid can be moved into its start position. Following this further reduction, the hood gap is preferably less than 6 mm, most preferably less than 3 mm, of particular preference less than 1 mm in this design form too following this further reduction. In a further improved execution form the hood gap is finally only 0 to 0.3 mm. For control, preferably one or several microswitches are provided for in turn which suitably detect positions of components and trigger start and stop signals for the drive dependent thereon.

Also following this further reduction of the hood gap by a preferably non force-limited movement the catch can preferably be pivoted into an overstroke position. The catch can therefore be further rotated preferably by at least 10°, of particular preference by at least 20°, most preferably by at least 30°. The possibility of further rotating the catch into an overstroke position can preferably lower the position of the locking bolt further by at least 10 mm, of particular preference by at least 20 mm viewed from the hood.

Finally, the latched position of the locking mechanism in one design can be also secured by a further pawl or a blocking lever. Thus, a blocking lever can be pivoted into a position which prevents the pawl from being moved out of its ratched position. Also following this additional securing, the catch can preferably be pivoted into an overstroke position.

Closure of the hood takes place in a preferred configuration in the following sequence:

The hood is manually supported or closed, whereby the impact absorber is activated. The hood gap is then 15 mm.

A start signal then activates a rotation of the catch starting from its open position. The hood gap initially remains at 15 mm.

A force-limited closure or lowering of the hood by a swing arm and a drive for the swing arm subsequently occurs.

The hood gap is 6-7 mm following this force-limited lowering. A stop signal stops the drive due to an activation of a microswitch.

Following an intermission of one second, for example, the drive is restarted and further lowered if necessary until the hood gap is 6 mm.

The locking mechanism is subsequently latched by the pawl being moved into its ratched position. A hood gap of 4-6 mm is then present.

The drive then moves the impact absorber out of its retaining position.

The catch is moved further in such a way that the hood gap is made even smaller and finally practically no longer exists.

Optionally, the locking mechanism is now additionally secured by a further latch or a blocking lever.

Opening is preferably executed as follows:

A first activation occurs. Thus, for example, a switch can be activated or opening can take place electronically thus, for example, by activation of a sensor or transmitter.

Starting from a hood gap of 0 mm or close to 0 mm, the drive starts due to activation which then, if necessary, initially pivots the second pawl or the blocking lever into an opening position.

The drive increases the hood gap, thus for example up to 4 mm.

Subsequently, the drive activates the impact absorber, it therefore pivots the retention lever into its retaining position. The catch is thus blocked in the direction of the overstroke in order to lift the hood in a defect-free manner.

The drive increases the hood gap further, thus for example up to 6 mm.

The drive then preferably stops due to a stop signal which was triggered by a sensor, in particular a microswitch. The pawl is then still in its main ratchet position.

For example, due to a second activation or, for example, after lapse of a specified time the drive restarts and moves the pawl out of its ratched position. The hood gap can then be 6-8 mm. As the system is destressed, lifting the pawl out of its ratchet position can occur advantageously without an opening bang, therefore with minimal noise.

Subsequently, the hood is further opened by the drive until the hood gap is increased to the maximum and, for example, is finally 15 mm.

If the hood gap is thus increased further, the drive stops. The hood can now be opened further, for example, manually in the desired manner.

A latching device for execution of the procedure demonstrates a locking mechanism comprising a catch and a pawl for latching of the catch. The latching device encompasses a drive with which the locking mechanism can be moved partially or completely, in particular using a swing lever, hereinafter also referred to as a swing arm, in such a way that a door gap or flap gap can be made smaller. If therefore a pertaining flap or hood is closed, a gap initially remains between the flap and the adjacent chassis. By means of the drive the swing arm and thus the locking mechanism or parts of the locking mechanism can be moved in such a way that this gap decreases. In order to minimize the weight and the number of parts, the catch and the pawl are preferably pivotably attached to the swing arm by means of axes.

In one design, a retention lever is attached to the swing arm to retain the catch and is preferably pivotably attached. The retention lever forms the impact absorber. This means that the catch can strike the retention lever during a closure process in order to initiate an impact from the catch into the chassis directly or indirectly. The impact absorber is therefore either attached directly to the chassis or, for example, to the aforementioned swing arm, which in turn is thus connected or connectable to the chassis in such a way that the impact forces are conducted into the chassis via the swing arm. This execution form contributes to mechanically sensitive components such as the drive being protected from such impact forces and thus damage.

The latching device is in particular created in such a way that the pawl can only latch the catch when the catch has been retained by the retention lever. This design contributes to a hood gap already being relatively small before the catch is latched. This contributes to preventing injuries due to trapped fingers and such.

In one design, the latch or latching device is created in such a way that the pawl can only latch the catch after the drive has pivoted the swing arm for reduction of a hood gap. This contributes to preventing injuries due to trapped fingers and such.

In one design, there is a control contour which is capable of pivoting the retention lever out of its retaining position after the retention lever has retained the catch. In a technically simple manner, a latch with advantageous characteristics can thus be provided with a small number of parts, which is capable of protecting in particular a drive for gap minimization from impacts and which is created in such a way that the risks of injury due to trapped fingers are prevented.

In one design, there is a control contour which is capable of pivoting the retention lever out of its retaining position by the swing arm being pivoted for reduction of a hood gap or flap gap. In a technically simple manner, a latch or a latching device with advantageous characteristics can thus be provided with a small number of parts, which is capable of protecting in particular a drive for gap minimization from impacts and which is created in such a way that the risks of injury due to trapped fingers are prevented.

In one design, there is a rod which can be activated by a drive in order to move the pawl into or out of its ratched position. This design enables suitable pivoting of the pawl. As a drive, a drive is envisaged in particular which is capable of pivoting the swing arm. The number of drives required is thus kept low. Alternatively, a control contour can be provided for with which the movement of the pawl in particular effected by pivoting movements of the swing arm can be suitably controlled. The pawl is in particular pre-tensioned by a spring in such a way that the pawl can be moved into its ratchet position by spring force.

In a technically simple design, the drive has a drive disk which is capable of pivoting the swing arm.

In one design, the drive disk possesses a protruding bolt, hereinafter also referred to as the first bolt, which restricts rotary movements of the drive disk. In particular, a rotation of the drive disk in this execution form causes the bolt to be moved against a stop in order to suitably limit rotary movements of the drive disk. The first bolt is in particular attached at the edge in order to enable compact construction space.

In one design of the invention, the stop for the first bolt is provided by a moving stop and in particular by a pivotably located lever. It is thus possible to enable rotary movements of the drive disk despite the presence of a stop which is up to 360° and more. Preferably the pivotably located lever demonstrates a T-shaped end in order to act directly as a stop. The first bolt then reaches in particular into an angle of the T-shaped end when the drive disc is rotated as far as possible. There are preferably one or two further stops, for example in the form of bolts, which limit the movements of the mobile stop, therefore, for example, the pivoting movements of the pivotably located lever in order to provide a stop in a particularly reliable manner which is capable of suitably limiting the rotary movements of the drive disk.

In one design, the drive disk possesses a protruding bolt, hereinafter referred to as a second bolt, with which pivoting movements of the swing arm can be controlled by supporting. During a closure process, the swing arm is supported on this second bolt and preferably with an arched end. Rotary movements of the drive disk then enable movement of the second bolt. Thus, pivoting of the swing arm is enabled during a latching process for the purpose of making a gap smaller if the swing arm is supported by the second bolt. As the swing arm is only supported, it can be manually pivoted away from the bolt. The door or flap is therefore not closed with the force expended by the drive. Risks of injury are prevented if a finger is then located in the gap of a pertaining door or flap or hood.

In one design, a protruding bolt, hereinafter also referred to as a third bolt, is attached to the drive disk which can be moved into an arch-shaped end of the swing arm by rotating the drive disk in order to thus capture and pivot the swing arm. This design determines the position of the swing arm by the position of the bolt during a latching process when the bolt has been moved into the arch-shaped end. Manual movements of the swing arm by pivoting of a door or flap are then no longer possible. The door or flap can then be closed with the force expended by the drive. Thus, for example, against sealing pressure of a flap seal.

In one design of the invention, a pivoting of the swing arm in order to make the gap smaller is initially effected by the aforementioned second bolt and subsequently by the aforementioned third bolt. In a first phase during making a gap smaller a finger located in the gap can therefore not be further trapped by the drive. Only when the gap has been made sufficiently smaller does the third bolt make the gap smaller and shuts the flap.

In one design of the invention, there is preferably a pivotably attached bracing lever which is capable of bracing the swing arm when an impact is initiated in it due to a latching process. This design contributes to the drive being protected from such impact forces and thus damage. In order to suitably distribute loads for the purpose of damage prevention, the bracing lever in particular braces the pivotable end of the swing arm.

In one design of the invention, pivoting movements of the bracing lever are effected by a bolt, preferably by the stated second bolt, of the rotary disk. The bracing lever can thus be moved out of its bracing position at a suitable time in order to make the gap smaller by subsequent pivoting of the swing arm. The bracing lever is preferably pre-tensioned by a spring and namely in such a way that the bracing lever can be pivoted into its bracing position by spring force.

In one design form of the invention, the catch and pawl are arranged close to the axis around which the swing arm can be pivoted. The distance of the axes from catch and pawl to the axis of the swing arm is therefore less than the distance between the axes of catch and pawl to the end of the swing arm which is pivoted. A beneficial lever ratio is thus provided in order to be able to move the locking mechanism for example against sealing pressure with great force. In particular, the catch and/or the pawl are attached by their axes in a first third of the swing arm. Consequently, the lever ratio is at least 1:2.

In one design of the invention, the catch can be pivoted away from the opening position when this is latched. If there are several ratchet positions, i.e. a main ratchet and a pre-ratchet, this applies for the main ratchet position. In particular, there is no stop which is capable of limiting this pivoting away from the (main) ratchet position if the locking bolt is moved beyond the envisaged ratched position, i.e. opposite to the opening movement or in the direction of the overstroke position of the catch. Thus, risks of injury are prevented. If a person falls onto the systematically closed motor hood, the motor hood is also advantageously flexible in the area of the latch or the latching device in this execution form.

The latching device preferably possesses one or several microswitches with which positions of one or several components of the latching device can be ascertained. This is used in particular to suitably control the drive.

Figure 2:
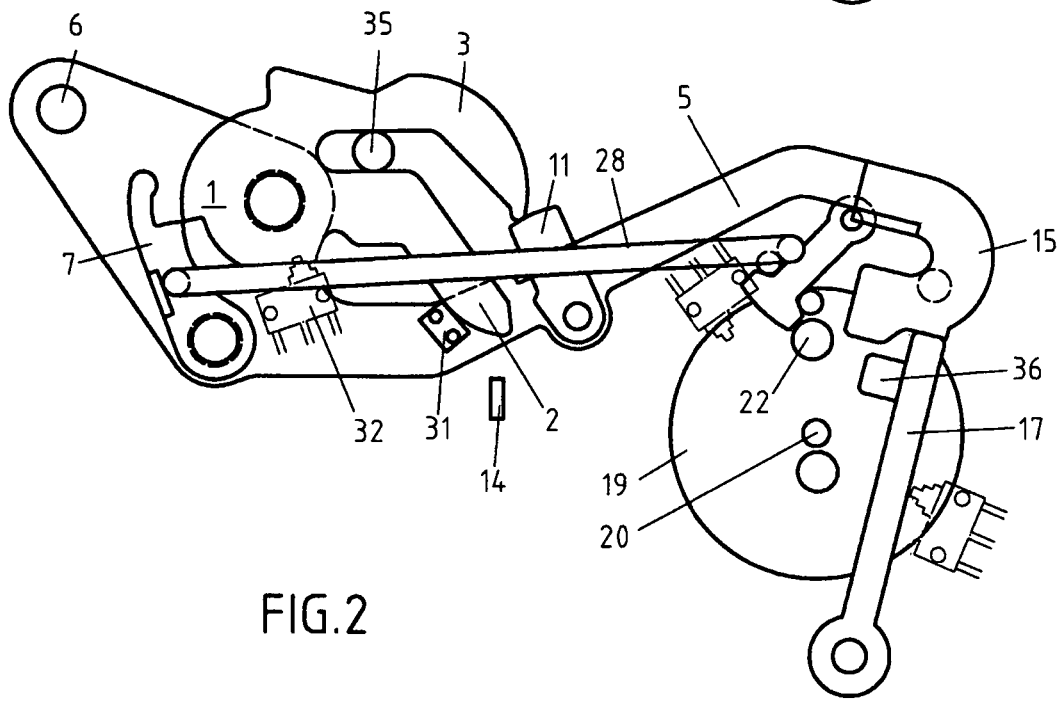
Figure 3:
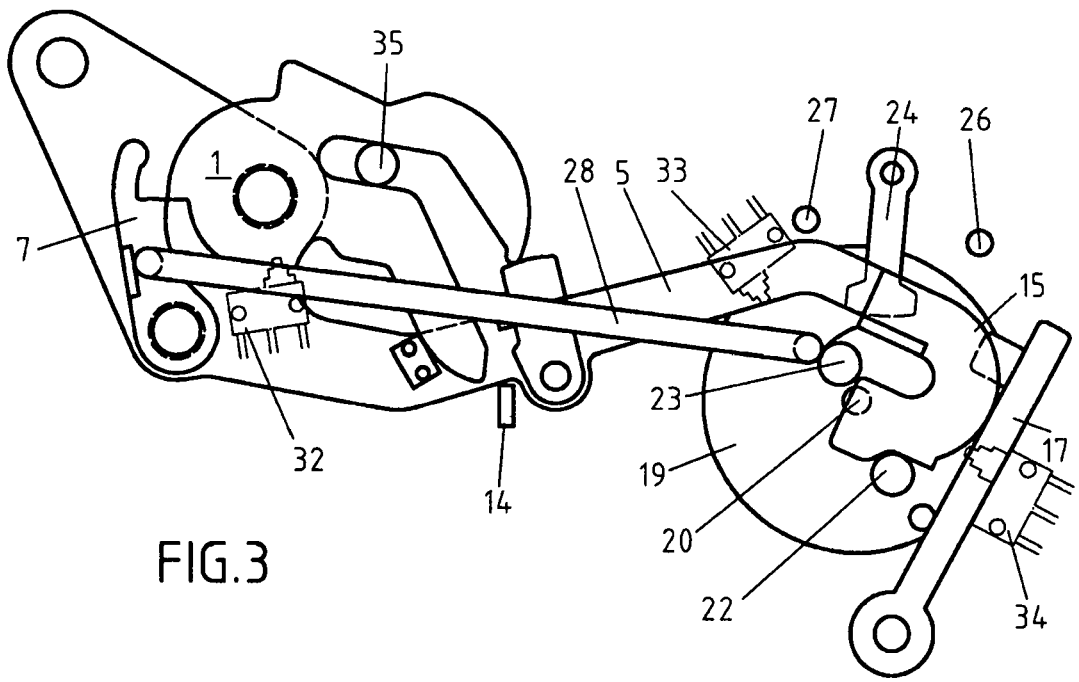
Figure 4:
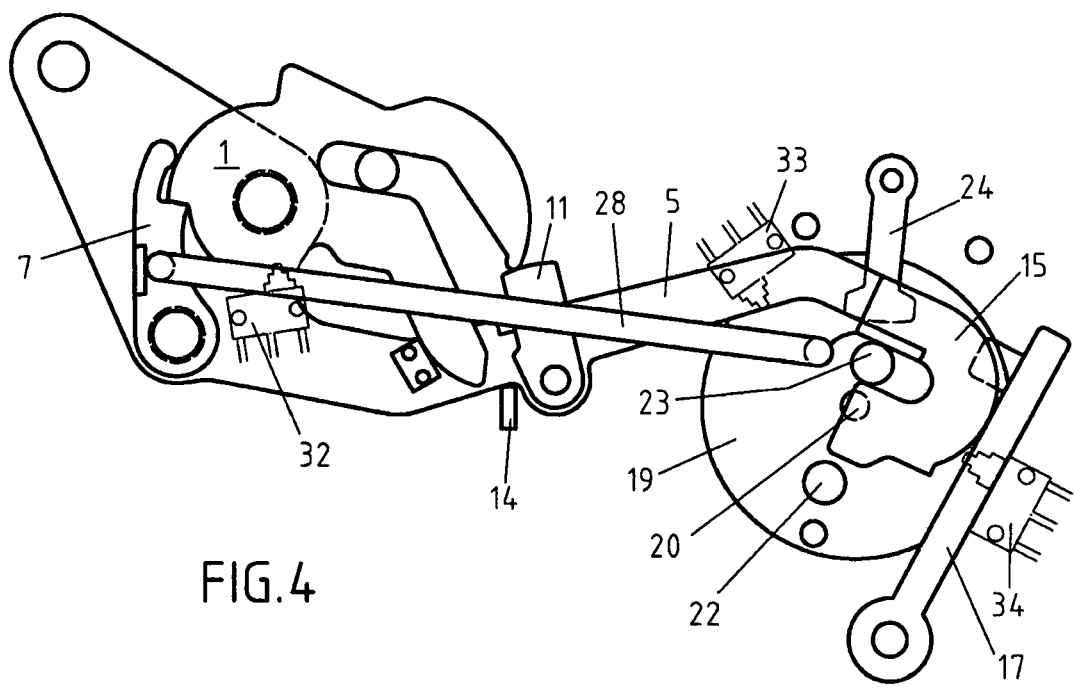
Figure 5:
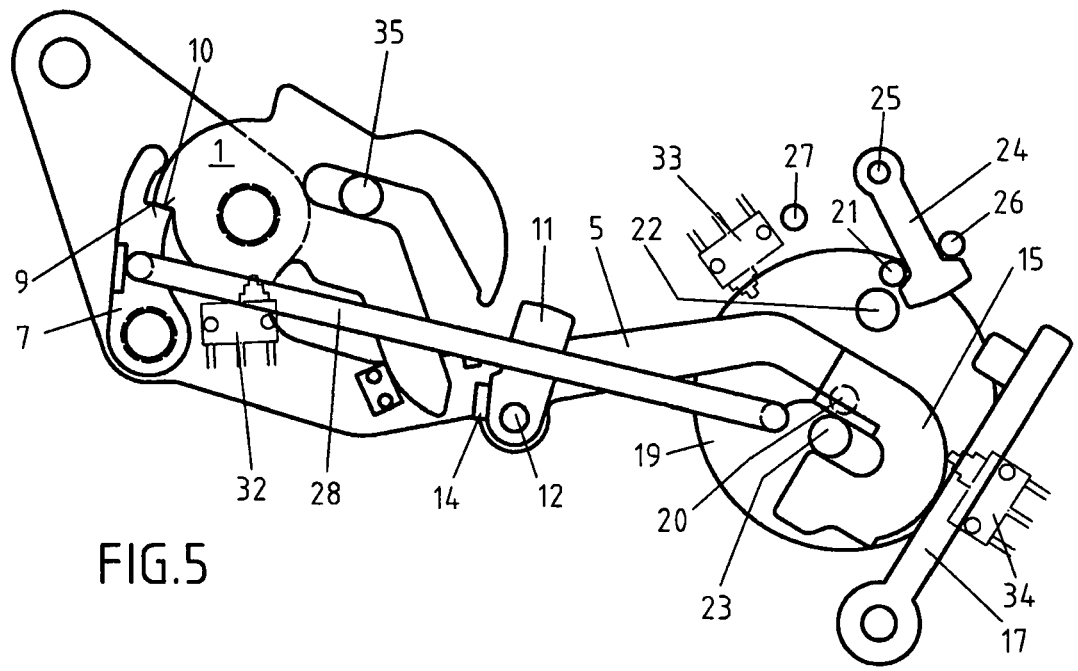
Figure 6:
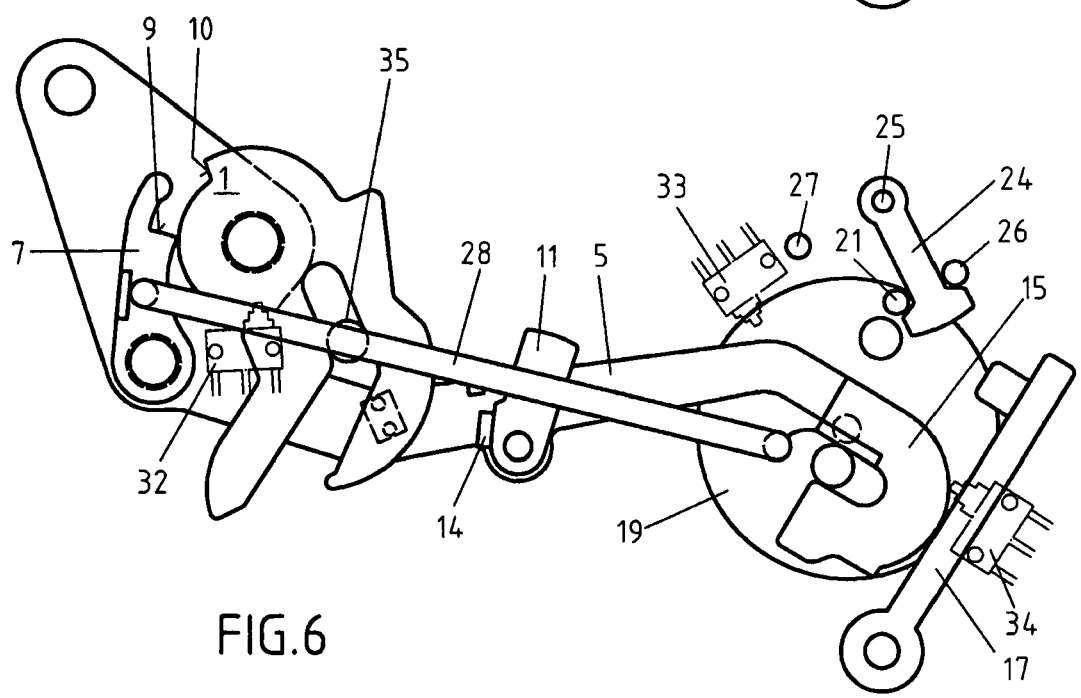

The following are shown:
FIG. 1: Latching device in the open position;
FIG. 2: first phase during a latching process;
FIG. 3: second phase during a latching process;
FIG. 4: third phase during a latching process;
FIG. 5: Latching device in the latched position;
FIG. 6: Latching device with catch in an overstroke position.

FIG. 1 shows a catch 1 with a collecting arm 2 and load arm 3 in its open position. The catch 1 is pivotably attached with an axis 4 on a swing arm 5. The swing arm 5 can be rotated around its axis 6. The axis 6 is attached to a non-illustrated chassis directly or, for example, indirectly via a non-illustrated latch plate to the chassis of a motor vehicle. The catch 1 can be latched by means of a pawl 7. The pawl 7 is pivotably attached to the swing arm 5 by means of an axis 8. The pawl 7 possesses a ratchet surface 9. This ratchet surface 9 is adjacent to the ratchet surface 10 of the catch 1 when the catch 1 is latched.

A retention lever 11 is pivotably attached to the swing arm 5 with an axis 12 in a middle area of the swing arm 5. The retention lever 11 acts as an impact absorber in order to protect in particular the subsequently described stop from damage when the hood is closed.

The swing arm 5 is equipped with a protruding stop 13 which limits the pivoting of the retention lever 11 in an anti-clockwise direction. The retention lever 11 is preferably pre-tensioned by a non-illustrated spring so that this can be pivoted by pre-tensioning in the direction of the stop 13. A control contour 14 is attached to the latch plate or directly to the chassis with which the pivoting of the retention lever 11 can be controlled.

In the shown open position of the locking mechanism, the pivotable, arch-shaped end 15 of the swing arm 5 is braced on a pivotable end 16 of a bracing lever 17. The bracing lever 17 is attached to a latch plate or directly to the chassis with an axis 18. The bracing lever 17 can be pivoted around the axis 18.

A drive disk 19 is pivotably located around its axis 20. The axis 20 is attached to a latch plate or directly to the chassis. A first bolt 21, a second bolt 22 and a third bolt 23 protrude from the drive disk 19. The three bolts 21,22 and 23 and the axis 20 are preferably arranged roughly along a straight line in order to be able to utilize the rotary movements of the drive disk particularly well and simultaneously keep the construction space small. The first bolt 21 is arranged on the edge of the drive disk 19. The second bolt 22 is located between the axis 20 and the first bolt 21 near to the first bolt 21. The third bolt 23 is arranged near to the axis 20. The axis 20 is located between the second bolt 22 and the third bolt 23. The drive disk 19 can be rotated around its axis 20 by a non-illustrated electrical drive.

There is a pivotable lever 24 with a T-shaped end which can be rotated around its axis 25. The axis 25 is attached to a latch plate or directly to the chassis. There are preferably also two stops 26 and 27 for the lever 24 with the T-shaped end which are attached to a latch plate or directly to the chassis. The stops 26 and 27 limit the pivoting movement of the lever 24 with the T-shaped end.

The pivotable lever 24 with the T-shaped end limits rotary movements of the disk 19. Thus, in the illustrated open position the first bolt 21 of the drive disc 19 is adjacent to the T-shaped end of the lever 24. Consequently, the drive disk 19 can no longer be rotated in an anti-clockwise direction. In this position, the T-shaped end of the lever 24 preferably lies adjacent to the bolt-shaped stop 27 which ensures that the drive disk 19 can no longer be rotated in an anti-clockwise direction. Consequently, a mechanical end stop is attained.

There is a rod 28 with which the pawl 7 can be pivoted. The rod 28 is only depicted in diagrammatic form. It is suitably connected to the pawl 7 on the one hand and a drive on the other hand in a manner which is not described in further detail, for example, with the drive which is also capable of rotating the drive disk 19. The rod 28 can be pivotably connected with the pawl 7 with one end 29. Alternatively or additionally, the end 29 can be adjacent to a protrusion 30 of the pawl 7 in order to pivot the pawl 7 for example against a spring force out of a ratched position. The pawl 7 can therefore be pre-tensioned in one execution form by a non-illustrated spring in such a way that this spring is capable of moving the pawl 7 into its ratchet position.

A brake element, damping element or stop 31 can be attached to the swing arm 5 which is capable of limiting or braking a pivoting of the catch 1 in a clockwise direction at least sometimes. The element 31 preferably possesses a pre-determined breaking point which breaks when a pedestrian falls onto the hood in order to thus facilitate pedestrian protection. It is preferably made of plastic. The element 31 in particular prevents the catch from skidding downwards upon opening of the hood if the hood is exposed to a snow load, for example.

There are microswitches 32, 33 and 34, with which positions of locking mechanism components can be detected. The position of the catch 1 is detected with a first microswitch 32, for example. The position of the drive disk 19 is detected with a second microswitch 33, for example. The position of the swing arm 5 is detected with a third microswitch 34, for example. However, other alternative or additional microswitches can be provided for with which other positions and/or other components can be detected.

In FIG. 1, a locking bolt 35 is furthermore shown during latching of a pertaining hood which is attached to a non-illustrated hood of a motor vehicle. The locking bolt 35 has not yet reached the collecting arm 2 of the catch 1. The hood is still open.

The axes 4 and 8 of the catch 1 and pawl 7 are arranged relatively near to the axis 6, the bearing point of the swing arm and are thus relatively far from the end 15 of the swing arm 5 in order to thus provide a beneficial lever ratio.

If starting from FIG. 1 the hood of the motor vehicle is further closed, the locking bolt 35 initially reaches the collecting arm 2 of the catch 1 and subsequently rotates the catch 1 in a clockwise direction until the load arm 3 of the catch 1 strikes the retention lever 11. The thus associated impact is initiated via the retention lever 11 into the swing arm 5. From here, the impact or the associated forces are conducted into the chassis on the one hand via the axis 6 of the swing arm 5 and on the other hand via the bracing lever 17. The drive disk 19 is thus protected from impact forces occurring during closure. Additionally, the collecting arm 2 can have attained the stop 31 or the dampening element/ braking element 31 in order to additionally conduct impact forces from the catch 1 into the swing arm 5. The catch 1 has attained a position which would enable the pawl 7 to be moved into its ratchet position. However, this is initially prevented by the rod 28. The hood gap is, for example, still more than 12 mm, preferably at least 15 mm, so that fingers in the hood gap cannot at least be squashed very severely.

In particular, the gap between the hood and the headlight grille or radiator grille is 15 mm.

If the catch 1 reaches the position shown in FIG. 2, the microswitch 32 is thus activated, for example. Thus, the drive which is capable of driving or rotating the drive disk 19 can be set in motion. Whereupon the drive disk 19 rotates in a clockwise direction. The second bolt 22 thus reaches to the bracing lever 17 and for example captures a protrusion of the bracing lever 17. Further rotation of the drive disk 19 in a clockwise direction therefore leads to the bracing lever 17 being pivoted out of its position shown in FIG. 2 in a clockwise direction. The underside of the arch-shaped end 15 of the swing arm 5 lies meanwhile on the second bolt 22. A further rotation of the drive disk 19 in a clockwise direction results in the swing arm 5 being pivoted around its axis 6 in a clockwise direction and ultimately reaching the position shown in FIG. 3. This can be achieved by the closing movement of the flap or alternatively or additionally by gravity which impacts accordingly on a hood. A door or hood gap is decreased accordingly. The gap dimension is thus reduced to less than 10 mm, thus for example to 7 mm. The movement of the catch and the overlying hood is therefore force-limited preferably solely due to gravity. The drive only enables this movement and only contributes indirectly to moving the catch together with the overlying hood.

FIG. 3 clarifies that the lever 24 with the T-shaped end meanwhile has loosened from the stop 27. This lever has, for example, been pivoted into the position shown in FIG. 3 due to gravity. It is significant that the catch 1 has still not been latched although the hood gap is still only a few millimeters, thus, for example, a maximum of 7 mm, preferably a maximum of 5 mm. This is for safety reasons as, for example, a finger cannot be trapped in the hood gap. Only when the hood gap is sufficiently small that fingers can no longer fit into the gap, a further rotation of the drive disc 19 leads to the rod 28 being moved into a position which causes the pawl 7 to latch the catch 1. However, it can also be activated with attainment of the position shown in FIG. 3, for example the microswitch 33. Thus, a separate drive can be set in motion for the rod 28 which causes the pawl 7 to latch the catch 1 by relevant movement of the rod 28 as shown in FIG. 4. The catch 1 is latched in particular with a time delay of, for example, one second following stoppage of the drive.

As illustrated in FIGS. 3 and 4, the third bolt 23 of the drive disc 19 engages into the arch-shaped end 15 of the swing arm 5. The gap dimension is still several mm and is, for example, between 5 and 7 mm. A further rotation of the drive disk 19 in a clockwise direction results in the position shown in FIG. 5 ultimately being attained by closure. The third bolt 23 of the drive disk 19 which is meanwhile located within the arch-shaped end 15 of the swing arm 5 has pivoted the swing arm 5 around its axis 6 further in a clockwise direction. This can take place against a counter-pressure, such as the sealing pressure of a seal for the hood as it is now not moved in a force-limited manner. Thus, the hood gap is further reduced without fearing the risk of injury. The gap dimension can thus have been reduced to less than 1 mm, thus for example to not more than 0.2 mm or of particular preference not more than 0.1 mm.

Due to the control contour 14 the retention lever 11 is pivoted out of its position retaining the catch 1 in a clockwise direction around its axis 12. The first bolt 21 of the drive disk 19 has struck the other side of the T-shaped end of the lever 24 of the relevantly pivotable lever and pivoted this lever around its axis 25 in an anti-clockwise direction. This pivoting movement is finally limited by attainment of the stop 26 as shown in FIG. 5. A further rotation of the drive disc 19 in a clockwise direction is then not possible. By provision of the pivoting lever with the T-shaped end 24 rotation of the drive disk 19 is limited on the one hand. On the other hand, especially large rotational angles of the drive disk are facilitated and in particular also rotational angles of 360° and more.

As the retention lever 11 according to FIG. 5 is pivoted out of its retaining position, it is possible that the catch 1 is pivoted further in a clockwise direction, as shown in FIG. 6. This protects people who fall onto the pertaining hood, for example. The hood can thus be pushed further downwards in the area of the latch, without such a movement being blocked by the locking mechanism which reduces the risk of personal injury. So-called pedestrian protection can therefore be achieved. The locking bolt 35 can in particular be moved by more than 10 mm, preferably by at least 20 mm further in the opposite direction to the opening direction, i.e. further lowered when viewed from the hood. The latched catch can be pivoted away for this purpose by at least 10°, preferably by at least 20° from the opening position, as shown in FIG. 6.

An opening of the locking mechanism takes place relevantly vice versa.

The element 31 can be a plastic element with a predetermined breaking point as already executed. When, for example, snow is on the hood and the electrical drive lifts the hood, the plastic element prevents the catch from skidding downwards.

Alternatively, i.e. where the plastic element 31 is not present a strong spring can be arranged on the catch which in turn is strong enough to lift the hood with a snow load.

REFERENCE SIGN LIST

1: Catch
2: Collecting arm
3: Load arm
4: Catch axis
5: Swing arm
6: Swing arm axis
7: Pawl
8: Pawl axis
9: Pawl ratchet surface
11: Retention lever
12: Retention lever axis
13: Stop or rotation limiting element for retention lever
14: Control contour for retention lever
15: Arch-shaped end of the swing arm
16: Pivotable end of a bracing lever
17: Bracing lever
18: Bracing lever axis
19: Drive disk
20: Drive disk axis
21: First bolt of the drive disk
22: Second bolt of the drive disk
23: Third bolt of the drive disk
24: Lever with T-shaped lever end
25: Axis for lever with the T-shaped end
26: Stop or rotation limiting element for the lever with the T-shaped end
27: Stop or rotation limiting element for the lever with the T-shaped end
28: Rod for pivoting of the pawl
29: Rod end on the pawl
30: Pawl protrusion
31: Braking element or stop for the catch
32: Microswitch
33: Microswitch
34: Microswitch
35: Locking bolt
36: Protrusion of the bracing lever

The invention claimed is:

1. A method for latching of a hood of a motor vehicle to a chassis of the motor vehicle which comprises a latching device for the hood, with the latching device including a locking bolt attached to the hood and a locking mechanism comprising a catch and a pawl, the method comprising:

moving the hood from an open position toward a closed position;

engaging the locking bolt with the catch to pivot the catch around a rotational axis of the catch from an open position toward a ratchet position;

engaging the catch against a retention lever having a retaining position that prevents further rotation of the catch and movement of the hood, wherein the hood is retained in a position between the open position and the closed position forming a hood gap between the hood and the chassis of the motor vehicle;

moving the hood toward the closed position by moving the catch which is moved together with the hood using an electrical drive to reduce the hood gap between the hood and chassis of the motor vehicle stopping the electrical drive before the catch is in the ratchet position; and latching the catch in the ratchet position with the pawl to move the hood into the closed position and eliminate the hood gap.

2. The method according to claim 1, further comprising moving the hood the electrical drive in a force-limited manner before the catch is latched by the pawl.

3. The method according to claim 1, further comprising reducing the hood gap by at between 2 mm and 10 mm.

4. The method according to claim 1, further comprising delaying the catch being latched by the pawl after the electrical drive is stopped.

5. The method according to claim 4, further comprising reducing the hood gap using the electrical drive by between 0.5 mm to 2 mm before the catch is latched.

6. The method according to claim 1, wherein engaging the catch against a retention lever includes striking the retention lever with a load arm of the catch.

7. The method according to claim 1, further comprising moving the retention lever out of a retaining position in which the retention lever prevents further rotation of the catch and movement of the hood following latching of the catch by the pawl using of the electrical drive.

8. The method according to claim 7, further comprising moving the catch using the electrical drive following the moving of the retention lever out of the retaining position, whereby the hood gap is further reduced by at least 3 mm.

9. The method according to claim 8, wherein moving the catch using the drive includes moving the catch in a non-force-limited manner.

10. The method according to claim 3 further comprising reducing the hood gap by between 5 mm and 8 mm.

11. The method according to claim 1 further comprising retaining the hood in the position between the open position and the closed position to form a hood gap between that is between 12 mm and 30 mm.

12. The method according to claim 4, wherein delaying the catch being latched by the pawl includes delaying by at least half of a second.

13. The method according to claim 12, wherein delaying the catch being latched by the pawl includes delaying by at least one second.

14. The method according to claim 8, wherein moving the catch using the electrical drive reduces the hood gap by at least 5 mm.

15. A method for latching of a hood of a motor vehicle to a chassis of the motor vehicle which comprises a latching device for the hood, the latching device including a locking bolt attached to the hood and a locking mechanism comprising a catch and a pawl, the method comprising:

moving the hood from an open position toward a closed position;

engaging the locking bolt with the catch to pivot the catch around a rotational axis of the catch from an open position toward a ratchet position;

engaging the catch against a retention lever that prevents further rotation of the catch and movement of the hood, wherein the hood is retained in a position between the open position and the closed position forming a hood gap between the hood and the chassis of the motor vehicle;

moving the hood toward the closed position by moving the catch which is moved together with the hood to reduce the hood gap between the hood and chassis of the motor vehicle using solely gravitational force of the hood before the catch is in the ratchet position; and latching the catch in the ratchet position with the pawl to move the hood into the closed position.

\* \* \* \* \*